April 16, 1929. J. H. K. CARPENTER 1,709,428
VALVE GRINDER
Filed April 2, 1928

Inventor
J. H. K. Carpenter
By Lacey & Lacey, Attorneys

Patented Apr. 16, 1929.

1,709,428

UNITED STATES PATENT OFFICE.

JOHN H. K. CARPENTER, OF RICHMOND, VIRGINIA.

VALVE GRINDER.

Application filed April 2, 1928. Serial No. 266,669.

This invention relates to valve grinders and one object of the invention is to provide a device for grinding valves which may be employed in connection with an electric drill serving as a power unit and thereby allow the valves to be quickly ground with a minimum amount of labor on the part of the operator.

Another object of the invention is to provide a device of this character in which a drive shaft and a driven shaft forming elements thereof are rotatably supported by a casing and means enclosed within the casing for converting rotary movement of the drive shaft into oscillating movement for the driven shaft.

Another object of the invention is to so form the casing that it may constitute a shield for elements contained therein and also a grease container so that the parts of the valve grinder will be well lubricated and to further permit the casing to be readily opened when it is necessary to take the valve grinder apart in order to clean or repair the same or replenish the supply of lubricating grease in the casing.

Another object of the invention is to provide the valve grinder with an attaching yoke for engagement with an electric drill and securely but releasably connect the yoke with the casing by fasteners which serve not only as means for securing the yoke but also to releasably secure a removable bottom of the casing in place.

Another object of the invention is to provide the casing with very good means to rotatably mount the drive shaft and driven shaft and to so form a bearing for the driven shaft that wear upon the same may be compensated for and longitudinal play prevented.

Another object of the invention is to provide a valve grinder which will be simple in its construction and consist of a comparatively few number of parts all of which are very strong and durable and not liable to easily break or get out of order.

The invention is illustrated in the accompanying drawing, wherein

Figures 1, 2, 3:
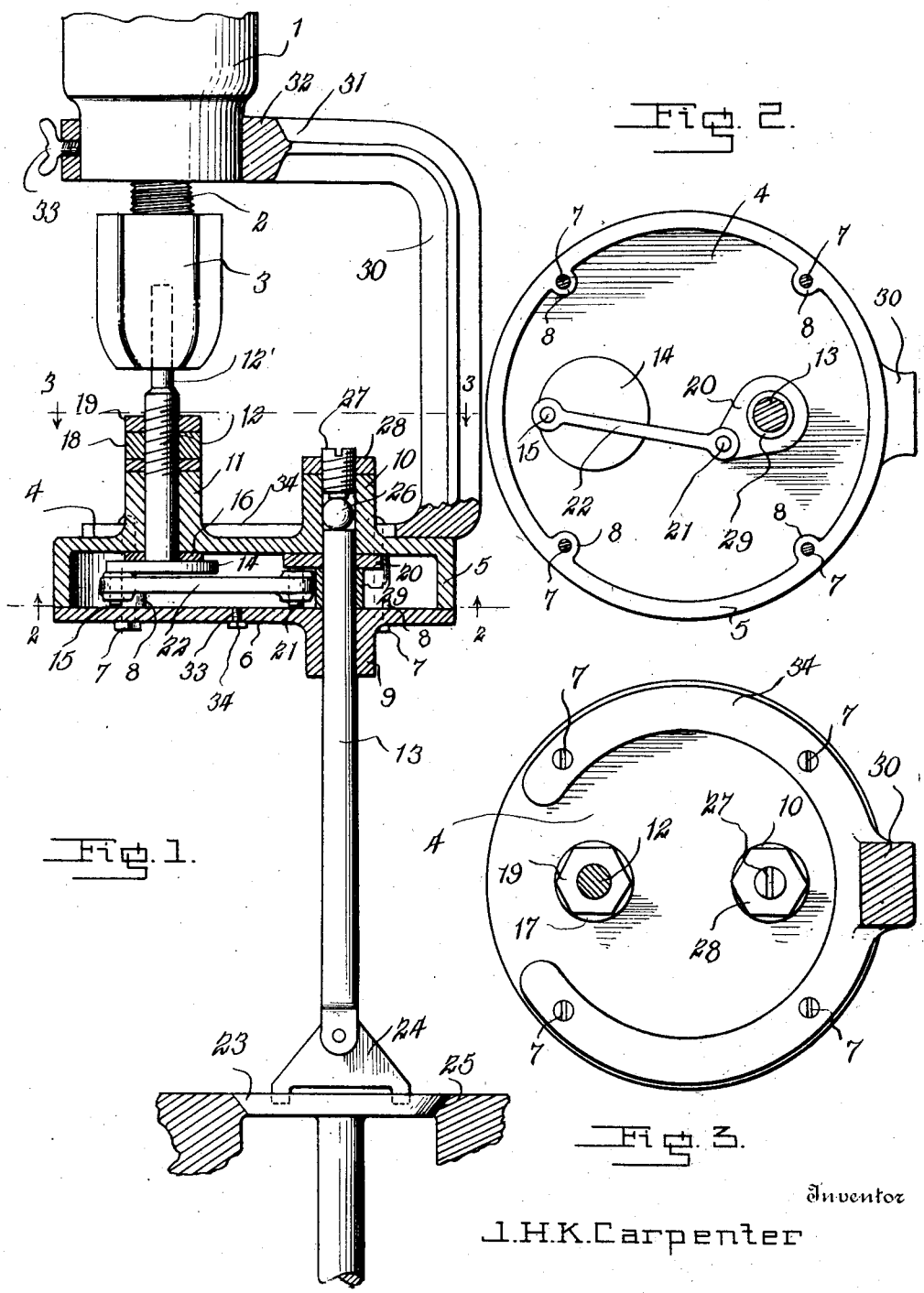
Figure 1 is a view showing the valve grinder partially in section and partially in side elevation and connected with an electric drill, a portion of which is shown in elevation.
Fig. 2 is a transverse sectional view through the casing of the valve grinder taken on the line 2—2 of Fig. 1.
Fig. 3 is a transverse sectional view through the valve grinder taken on the line 3—3 of Fig. 1 and showing the casing in top plan.

The improved valve grinder constituting the subject-matter of this invention is intended for use in connection with an electric drill, a portion of which is shown in elevation in Fig. 1 and indicated in general by the numeral 1. This drill is of a conventional construction and includes a rotary shaft 2 carrying a chuck 3 which is threaded upon the shaft 2 and when rotated thereon moved into or out of position to grip the drive shaft of the valve grinder in the same manner it will grip a bit of a conventional construction.

The casing 4 of the valve grinder is formed of strong metal and includes an upper head having an annular wall 5 formed integral therewith. The casing is open at its lower end and this open end of the casing is normally closed by a cap or head 6 which fits against the annular walls 5 where it is removably secured by bolts 7 passed through openings formed in bosses 8 which are spaced from each other about the casing, as shown in Fig. 2. By this arrangement the cap or head 6 may be very easily removed when it is necessary to have access to the interior of the casing in order to make repairs or adjustments or replenish a supply of lubricating grease with which the casing will be preferably filled. A bearing neck 9 extends downwardly from the head 6 in opposed relation to a companion bearing neck 10 which projects upwardly from the head of upper wall of the casing and the upper wall of the casing carries a second bearing neck 11 disposed in spaced relation to the bearing 10, as shown in Fig. 1. These bearings are to rotatably receive the drive shaft 12 and driven shaft 13, the drive shaft being rotatably received in the bearing 11 and the driven shaft rotatably received in the bearings 9 and 10 with a portion extending through the casing between the two companion bearings.

The drive shaft is of greater length than the depth of the bearing 11 and projects upwardly therefrom with its upper end portion 12' reduced and so formed that it may be received in the chuck 3 of the electric drill and firmly gripped thereby. At its inner end the drive shaft carries a circular disk or head 14 from which extends a depending pin 15 disposed adjacent its periphery, as shown in Fig. 2, and a wearing washer 16 is fitted upon the shaft between its head and the inner end of the bearing. A similar washer 17 is disposed about the drive shaft against the outer or upper end of the bearing and securing nuts 18 and 19 are threaded upon the shaft above the washer 17. It will be readily seen that by properly adjusting the nut 18 the shaft may be secured in such position that it will be permitted to turn freely but prevented from having longitudinal movement and the clamp nut 19 then tightened to firmly lock the nut 18 in place.

The driven shaft 13 carries a collar 20 which is fixed thereon in any desired manner and carries a depending pin 21 adapted to fit into an eye formed at one end of a pitman 22, the other end of which is also formed with an eye to receive the depending pin 15 of the disk 14. It will be readily seen from an inspection of Fig. 2 that, when the drive shaft is rotating, the pitman which connects the disk 14 with the collar 20 will cause oscillatory movement to be imparted to the driven shaft and, therefore, a valve 23 engaged by the bit 24 carried by the driven shaft will be turned against its seat 25 first in one direction and then in a reverse direction and the valve and seat will be properly ground with respect to each other. The upper end of the driven shaft bears against a bearing ball 26 loosely received in the bearing 10 and a retainer screw 27 for the bearing ball is screwed into the upper end portion of the bearing and releasably locked in a set position by a securing nut 28. A spacing sleeve 29 fits about the driven shaft between the collar 20 and removable head 6 of the casing and serves to prevent the driven shaft from sliding downwardly out of its proper position. By this arrangement the driven shaft will be rotatably supported with its upper end contacting with the bearing ball and it will be permitted to freely rotate when oscillating without having vertical movement. If the upper end of the driven shaft should become worn so that the driven shaft has vertical play, it is merely necessary to loosen the nut 28 and after tightening the screw 27 a sufficient extent to compensate for the wear again tighten the securing nut. The pins 15 and 21 terminate close to the removable head of the casing and, therefore, the pitman will be prevented from dropping downwardly out of operative engagement with them when the valve grinder is in use.

The yoke 30 which is employed to connect the valve grinder with the electric drill is also formed of strong metal and consists of an upright standard having an arm 31 extending from its upper end and terminating in an enlarged eye or collar 32 of sufficient size to easily fit upon the body portion of the drill adjacent the lower end thereof. A set screw 33 is carried by the collar and when tightened will serve to firmly hold the collar upon the drill. At its lower end the yoke is provided with a base 34 of an arcuate formation and preferably constituting the major portion of a circle of slightly less diameter than the casing. It will be obvious that the base may constitute an entire circle if so desired. This base fits against the upper face of the casing and is formed with openings spaced from each other at such distances that the screws 7 which secure the head 6 in place may also be employed to secure the base firmly against the casing. Therefore, it is not necessary to provide separate securing means for the yoke and removable head of the casing.

When the valve grinder is to be used, the collar is slipepd upwardly over the chuck 3 into place about the lower end of the casing of the drill and as this movement takes place the upper end of the drive shaft enters the chuck. The set screw 33 and the chuck are now tightened so that the chuck will have firm gripping engagement with the drive shaft and the yoke will be firmly anchored to the drill. If the bit carried by the drive shaft is of the proper size and shape, it is engaged with the head of the valve or if it is found that the bit does not fit the valve it is removed and one of the proper size or shape substituted. After the bit is engaged with the valve, the current is turned on to energize the drill and as the shaft of the drill rotates the drive shaft 12 will be rotated with it. As the drive shaft and its head or disk 14 rotate reciprocating movement will be imparted to the pitman and this pitman through its connection with the collar 20 carried by the driven shaft will impart oscillating movement to the driven shaft. Therefore, the driven shaft will rotate first in one direction and then in a reverse direction and a similar motion will be imparted to the valve so that its head and the seat 25 for the valve head will be accurately ground with respect to each other. In view of the fact that the drive shaft will be very rapidly rotated and the driven shaft also moved at a rapid rate of speed, the valve and its seat will be very quickly ground. After one valve and its seat have been ground, the valve grinder will be released from the valve and transferred to another to be ground. If it is found that it is necessary to replenish grease in the casing or make adjustments or repairs to any of the parts enclosed therein, it is merely necessary to remove the bolts 7 and the head 6 of the casing may be lifted out of place. The necessary repairs or cleaning can then be performed and a new supply of lubricating grease placed in the casing, after which the removable head of the casing will be again set in place and secured by the bolts. When the cap or head is removed, the pitman may be lifted from its mounting pins and the driven shaft together with its collar removed from the casing and by loosening and removing the nuts 18 and 19 the drive shaft may also be withdrawn. It will thus be seen that all of the elements constituting the valve grinder may be very easily taken apart and reassembled.

An opening 34 which is normally closed by a plug 35 is provided so that oil or grease may be forced into the casing when the plug is removed without releasing the cap 6.

Having thus described the invention, I claim:

A valve grinder comprising a casing open at its bottom, a cap for the open lower end of the casing, the cap and head of the casing having alined bearing sleeves projecting outwardly therefrom one above the other and the head of the casing having a second bearing spaced from the bearing sleeve thereof, a drive shaft rotatably mounted in the second bearing of the casing and having a head at its inner end and its outer end portion projecting upwardly for connection with the shaft of a power unit, a driven shaft journaled in the alined bearing sleeves of the cap and casing with a portion extending through the casing, a bearing ball in the upper bearing sleeve, a thrust pin screwed into the upper end of the upper bearing sleeve and engaging said ball to hold the ball in engagement with the upper end of said driven shaft, a collar fast upon the driven shaft within the casing, pins extending from the collar and head, a pitman extending between the head and collar and having eyes at its ends loosely engaged with the pins and serving to transform rotary motion of the drive shaft into oscillating motion for the driven shaft, and means to suspend the casing from a power unit in spaced relation beneath the same with the drive shaft operatively engaged with the power unit.

In testimony whereof I affix my signature.

JOHN H. K. CARPENTER. [L. S.]